Dec. 19, 1967 V. UZUNOGLU 3,359,428

BISTABLE MULTIVIBRATOR

Filed July 20, 1962

WITNESSES
Leon J. Faga
Dean Schron

INVENTOR
Vasil Uzunoglu
BY Ernest P. Klipfel
ATTORNEY

United States Patent Office 3,359,428
Patented Dec. 19, 1967

3,359,428

BISTABLE MULTIVIBRATOR

Vasil Uzunoglu, Hanover, Md., assignor to Westinghouse Electric Corporation, East Pittsburgh, Pa., a corporation of Pennsylvania Filed July 20, 1962, Ser. No. 211,360
3 Claims. (Cl. 307—88.5)

This invention, in general, relates to multivibrators, and in particular to bistable multivibrators using high speed switching devices.

It is an object of the present invention to provide a bistable multivibrator which eliminates the need for coupling capacitors and resistors.

It is another object of the present invention to provide a bistable multivibrator utilizing semiconductor devices having two stable states of operation and which will change states in response to input pulses of the same polarity.

It is a further object to provide an improved bistable multivibrator which utilizes only a single switching device.

Briefly, in accordance with the objects, there is provided a high speed multivibrator, or flip-flop, utilizing a semiconductor switching device whose voltage-current characteristic curve has two regions of positive resistance and one region of negative resistance between these positive resistance regions. The two positive resistance regions correspond to two stable states of operation, one in a lower voltage range and the other in a higher voltage range. Input means are provided for applying sequential input pulses to the semiconductor device to alternately switch states of operation. Diode means located in the input circuit is responsive to the voltage across the semiconductor device for alternately directing input pulses to alternate electrodes of the semiconductor device. Output means are additionally provided and are responsive to the change of states of operation of the semiconductor device to provide first and second potential level signals.

The above stated, and further objects of the present invention will become apparent upon a reading of the following detailed specification taken in conjunction with the drawings, in which:

FIGURE 1 is a typical characteristic curve of a semiconductor device which may be used in the present invention;

FIG. 2. is a characteristic curve of the diode means which may be used in the present invention;

Figure 1:
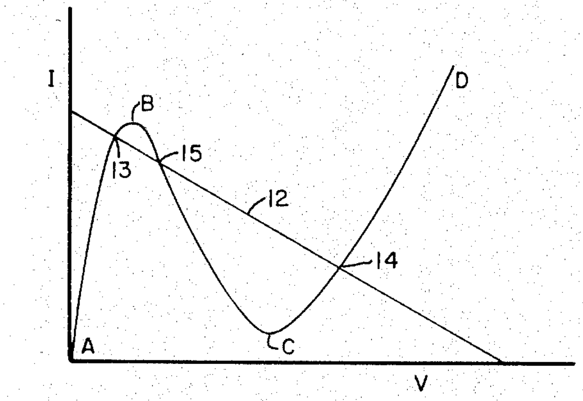

Referring now to FIG. 1, there is shown a typical characteristic curve of a tunnel diode, a semiconductor device which may be used in the present invention. It may be seen that the portions A to B and C to D exhibit the characteristics of a positive resistance, while the portion B to C exhibits the characteristic of a negative resistance. The use of the word tunnel diode herein is intended to include various types of circuit devices which exhibit similar characteristics. A typical load line 12, drawn on the characteristic curve intersects the curve at three points, 13, 15 and 14. Assuming that operation is at point 13, the low voltage state, if the current through the tunnel diode is increased the load line 12 will move parallel to itself until point B is reached, after which operation quickly jumps to the CD portion of the characteristic curve and after removal of the current causing the shift to the CD portion, the operating point will be at 14, the high voltage state of operation. By causing the load line to move downward along the CD portion of the characteristic curve, after point C is reached, operation will then switch back to the AB or low voltage state of operation.

If the tunnel diode is in its low voltage state of operation, it may be switched to its high voltage state of operation by an application of a positive pulse of sufficient magnitude to its anode or a negative pulse of sufficient magnitude to its cathode, both of which have the effect of moving the load line 12 parallel to itself upwardly along the characteristic curve. Conversely, operation may be switched from the high voltage to the low voltage state of operation by application of a negative pulse of sufficient magnitude to the anode, or a positive pulse of sufficient magnitude to the cathode, both of which have the effect of moving the load line 12 parallel to itself downwardly along the characteristic curve.

Figure 2:
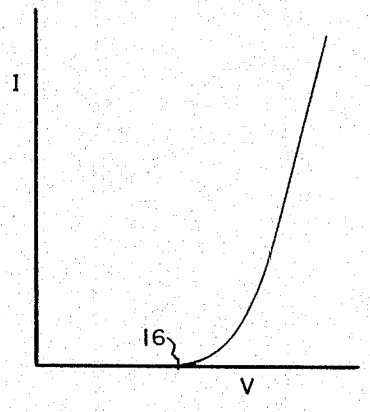

In FIG. 2 there is shown a typical characteristic curve for a semiconductor diode such as a silicon diode. It may be seen that there is no, or little conduction through the diode as the voltage across it is increased, until such point 16 is reached, after which, conduction occurs for relatively little increase in voltage.

Figure 3:
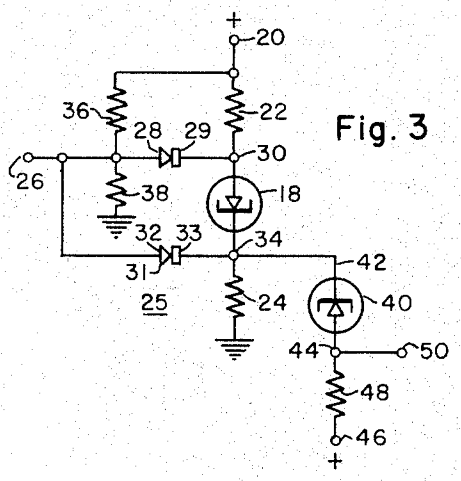
FIG. 3 shows one embodiment of the present invention.

FIG. 3 illustrates one embodiment of the present invention. Tunnel diode 18 is provided and exhibits the voltage-current characteristic of FIG. 1. Terminal 20 may be connected to a source of positive potential which acting in conjunction with resistors 22 and 24 bias the tunnel diode 18 into a first state of operation, which may for example, be the low voltage state of operation represented by point 13 of FIG. 1, the load line 12 being determined by resistances 22 and 24. Input circuit 25 is provided and includes an input terminal 26 for receiving sequential input pulses. Input terminal 26 is connected through diode 28 to the anode 30 of tunnel diode 18 and is also connected through diode 32 to the cathode 34 of tunnel diode 18. A voltage divider network comprising resistors 36 and 38 insures proper stability and biasing of diodes 28 and 32. In order to sense the changing of states of tunnel diode 18 an output circuit is provided and is connected to the cathode 34 and comprises tunnel diode 40 having a cathode 42 and an anode 44 in addition to biasing means for placing tunnel diode 40 into one of its operable states of operation. The biasing means comprises terminal 46 which may be connected to any suitable source of positive potential, and resistor 48. An output lead 50 may be connected to one of the electrodes of the tunnel diode 40, for example the anode 44, to sense the switching, or changing of states of the tunnel diode 40.

In operation, and by way of example, assume that the tunnel diodes 18 and 40 are both in their high voltage state of operation. It may be seen that the voltage at the anode 30 of tunnel diode 18 biases the cathode 29 of diode 28, and the voltage appearing at the cathode 34 of tunnel diode 18 biases the cathode 33 of diode 32. The biasing of the diode 28 is such that if a positive pulse of sufficient magnitude now appears at the input terminal 26, it will not be passed through diode 28 to the anode 30 of tunnel diode 18. The voltage appearing at the cathode 34 of tunnel diode 18 which biases diode 32 is not sufficient to block the input pulse from passing through diode 32 and the input pulse appears at the cathode 34 of tunnel diode 18 thus reducing the voltage drop across the tunnel diode 18 and causing it to assume its low voltage state of operation. At substantially the same time, the input pulse passing through diode 32 causes tunnel diode 40 to also assume its low voltage state of operation which change appears at output 50 as a first potential level signal. The switching of tunnel diode 18 to its low voltage state of operation has the effect of lowering the voltage at anode 30 and increasing the voltage at cathode 34. Upon the occurrence of a next positive input pulse at terminal 26, the biasing of cathodes 29 and 33 of diodes 28 and 32 is such that diode 32 will block any input pulse, and diode 28 will pass the input pulse to the anode 30 of tunnel diode 18 to thereby switch its state of operation to the high voltage region. The switching of tunnel diode 18 to the high voltage state of operation causes the voltage at cathode 34 to decrease which has the effect of decreasing the voltage at cathode 42 of tunnel diode 40. This decrease in cathode potential serves to switch tunnel diode 40 to its high voltage state of operation which is sensed by output lead 50 to provide a second potential level signal. The lowering of potential at cathode 34 of tunnel diode 18 also serves to bias the diode 32 for passing a next sequential input pulse at terminal 26, which operation was previously explained. It may be seen, that sequential input pulses at terminal 26 alternately pass through diodes 28 and 32 to cause switching of states of operation of tunnel diode 18 and tunnel diode 40 to alternately produce first potential level signals and second potential level signals at output lead 50, which may be utilized as binary ONE and binary ZERO output signals.

Figure 4:
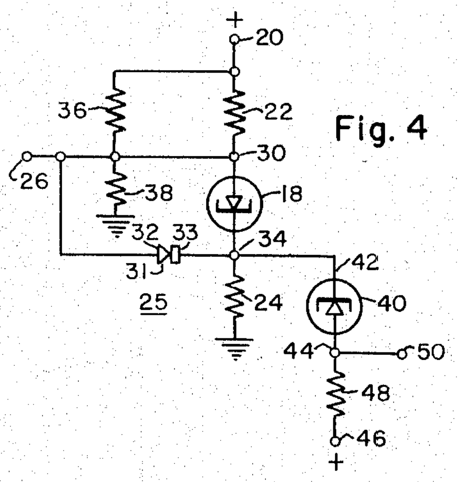
FIG. 4 shows another embodiment of the present invention.

Referring now to FIG. 4, there is shown another embodiment of the present invention. The circuit of FIG. 4 is similar to the circuit of FIG. 3 except that the input circuit 25 contains only one diode 32 instead of two diodes. Like reference characters in FIG. 4 and the following figures indicate like circuit elements, but may vary in choice of value depending upon circuit use and design. In the operation of the circuit of FIG. 4 assume that the tunnel diodes 18 and 40 are both in a first state of operation, for example their low voltage state of operation. The voltage divider network comprising resistors 36 and 38 bias the anode 31 of diode 32. In addition it may be seen that the voltage appearing across tunnel diode 18 is also applied to the diode 32. With the tunnel diode 18 in its low voltage state of operation, the bias applied to diode 32 is insufficient to bring it near conduction. An input pulse appearing at input terminal 26 will be applied to the anode 30 of tunnel diode 18 causing it to switch to its high voltage state of operation. This same input pulse is insufficient to cause conduction of diode 32, and the input pulse will not appear at the cathode 34 of tunnel diode 18. The tunnel diode 18 now being in its high voltage state of operation applies an increased voltage across the diode 32 to bring it to a point near conduction, for example point 16 of the curve of FIG. 2. When the tunnel diode 18 changed to its high voltage state of operation the potential at cathode 34 dropped in value, which decrease appears at cathode 42 of tunnel diode 40 thus causing tunnel diode 40 to assume its high voltage state of operation and a signal to appear on output lead 50. Upon the occurrence of a subsequent input pulse, the voltage appearing at anode 30 of tunnel diode 18 will increase its operation along the portion of the curve CD of FIG. 1, still in the high voltage state of operation. After a short time delay due to propagation time and inherent capacitance in the diode 32, the input pulse will be passed through the diode 32 since it was biased near conduction. It may therefore be seen that the input pulse will first appear at the anode 30 and no change of state occurs. After a short time delay the appearance of the input pulse at the cathode 34 of tunnel diode 18 will cause the switching of the tunnel diode 18 back to its low voltage state of operation. The positive pulse appearing at the cathode 34 is also coupled to the cathode 42 of tunnel diode 40 to cause it to switch back to its low voltage state of operation, thus producing a different signal at the output lead 50. Subsequent input pulses will cause repetition of the afore-described cycle of operation to cause the output lead 50 to provide a first and a second potential level signal in response to like polarity sequential input pulses.

Figure 5:
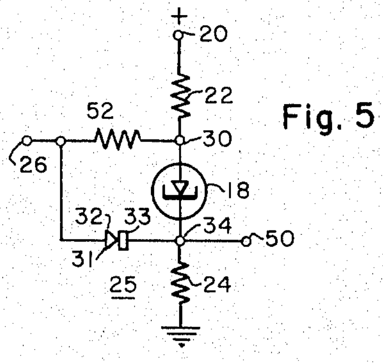
FIG. 5 is a further embodiment of the present invention.

Referring now to FIG. 5, there is shown a further embodiment of the present invention which utilizes a single tunnel diode and only one diode in the input circuit. An additional resistor 52 may be provided in the input circuit to control the current caused by an input pulse. The operation of the circuit of FIG. 5 is somewhat similar to the operation of the circuit of FIG. 4 in that the voltage appearing across the tunnel diode 18 is applied to the diode 32 of the input circuit 25. The output means of the circuit of FIG. 5 comprises output lead 50 connected directly to the cathode 34 of tunnel diode 18 to sense the changes of states of operation of the tunnel diode. Assuming that the tunnel diode 18 is in a low voltage state of operation, the biasing of diode 32 will be insufficient to bring it near conduction and a positive input pulse appearing at input terminal 26 will be applied through the resistor 52 to the anode 30 of tunnel diode 18. This same input pulse is also applied to the diode 32 but is insufficient to bring the diode into conduction. The input pulse therefore causes tunnel diode 18 to switch to its high voltage state of operation which decreases the potential appearing at cathode 34 thus showing up on output lead 50 as a first potential level signal. With the tunnel diode 18 now in its high voltage state of operation, the biasing potential applied to diode 32 is increased to a point, for example 16 shown in FIG. 2 of the diode characteristic curve, so that upon the occurrence of a next positive input pulse at terminal 26, diode 32 will conduct, after the aforementioned short time delay so that the input pulse appears at the cathode 34 of tunnel diode 18 to thereby switch the state of operation back to the low voltage region in addition to causing a second potential level signal to appear on output lead 50. The cycle of operation is then repeated upon subsequent positive input pulses with the diode 32 being biased by the voltage across tunnel diode 18 to near conduction on every other input pulse.

Figure 6:
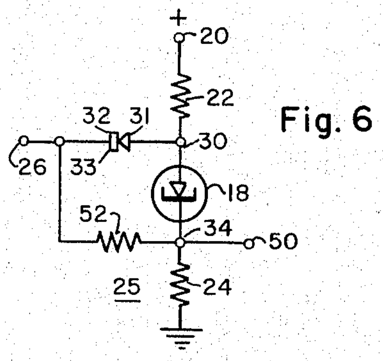
FIG. 6 shows a variation of the circuit of FIG. 5.

FIG. 6 shows a variation of the circuit of FIG. 5 and is adapted to produce first potential and second potential level signals upon application of sequential negative input pulses. The operation of the circuit of FIG. 6 is similar to the operation of the circuit of FIG. 5 in that the voltage appearing across the tunnel diode is utilized to bias the diode 32. With the tunnel diode 18 in its low voltage state of operation, a negative input pulse will appear through resistor 52 at cathode 34 to switch the tunnel diode 18 to its high voltage state of operation. This same negative input pulse will be insufficient to cause conduction of diode 32 since the biasing voltage provided by the tunnel diode 18 was insufficient to bias the diode 32 to near conduction. With the tunnel diode 18 now in its high voltage state of operation, the diode 32 is biased near conduction and a negative input pulse will appear at cathode 34 causing the tunnel diode 18 to remain in its high voltage state of operation, and after a short time delay, at the anode 30, to thereby switch the tunnel diode 18 back to its low voltage state of operation after which the cycle is repeated for subsequent sequential negative input pulses.

It may be readily seen that the circuits described in FIGS. 3 and 4 with slight modifications may also be operable to provide desired output signals upon the application of negative input pulses. Although the present invention has been described with a certain degree of particularity it should be understood that the present disclosure has been made by way of example and that changes in the details of construction and the combination and arrangement of circuitry parts may be resorted to without departing from the scope and spirit of the invention.

What is claimed is:

1. A bistable multivibrator operative with sequential input pulses and comprising in combination: a tunnel diode having two electrodes and operable in a first and second state of operation; biasing means for placing said tunnel diode into a first state of operation; input means including a resistor having one end connected to an electrode of said tunnel diode, a diode connected between the other electrode of said tunnel diode and the other end of said resistor, and means for applying said input pulses to the junction between said resistor and said diode, for alternately switching states of operation of said tunnel diode in response to said sequential input pulses; and output means for sensing the changes of states of operation of said tunnel diode.

2. A flip-flop circuit comprising in combination: tunnel diode means operable in first and second states of operation; biasing means for placing said tunnel diode means into a first state of operation; input signal means including only one diode connected in parallel relationship with said tunnel diode means whereby the voltage across said tunnel diode means biases said one diode, said one diode being substantially nonconductive until a predetermined voltage is applied thereto; said tunnel diode means responsive to an input pulse of predetermined amplitude and polarity to switch said tunnel diode means into a second state of operation, said input pulse simultaneously being applied to said one diode but being of insufficient amplitude to drive said one diode into conduction, the voltage across said switched tunnel diode means biasing said one diode near conduction, a subsequent input pulse causing conduction of said one diode to place a lower voltage across said tunnel diode means to switch it back to its first state of operation; and output means connected to said tunnel diode means to sense the switching from one state to another.

3. A bistable multivibrator comprising in combination: a tunnel diode having at least two electrodes and operative in a first and second stable state of operation; means for establishing a load line on the characteristic curve of said tunnel diode and a first state of operation; input means for receiving input pulses of predetermined polarity and amplitude and including a diode having one electrode connected to one electrode of said tunnel diode, D.C. linear resistance means connecting the other electrode of said diode to the other electrode of said tunnel diode, the voltage across said tunnel diode, when in a first state of operation, biasing said diode near conduction such that upon the occurrence of an input pulse said diode will conduct and cause said tunnel diode to switch to a second state of operation; the voltage across said tunnel diode, when in a second state of operation, being insufficient to bias said diode near conduction such that upon the occurrence of a next pulse said diode will not conduct and said next pulse will cause said tunnel diode to switch back to said first state of operation; and output means for sensing the switching of states of said tunnel diode.

References Cited

UNITED STATES PATENTS

| | | | |
|---|---|---|---|
| 2,991,373 | 7/1961 | Morgan | 307—88.5 |
| 3,061,743 | 10/1962 | Atzuki Fukui et al. | 307—88.5 |
| 3,103,600 | 9/1963 | Lewin | 307—88.5 |
| 3,155,846 | 11/1964 | Parham | 307—88.5 |

ARTHUR GAUSS, *Primary Examiner.*

JOHN W. HUCKERT, *Examiner.*

R. H. EPSTEIN, J. JORDAN, *Assistant Examiners.*